(12) United States Patent
Miftakhov et al.

(10) Patent No.: US 11,862,780 B2
(45) Date of Patent: Jan. 2, 2024

(54) FUEL CELL—BATTERY HYBRID SYSTEM FOR TRANSPORTATION USE

(71) Applicant: ZeroAvia, Inc., Hollister, CA (US)

(72) Inventors: Valery Miftakhov, San Carlos, CA (US); Vadim Belogorodsky, Huntingdon Valley, CA (US); Ilya Grishashvili, San Jose, CA (US)

(73) Assignee: ZeroAvia, Inc., Hollister, CA (US)

( * ) Notice: Subject to any disclaimer, the term of this patent is extended or adjusted under 35 U.S.C. 154(b) by 0 days.

(21) Appl. No.: 16/798,297

(22) Filed: Feb. 21, 2020

(65) Prior Publication Data

US 2021/0320353 A1    Oct. 14, 2021

(51) Int. Cl.

| | | |
|---|---|---|
| *H01M 16/00* | (2006.01) | |
| *H01M 10/44* | (2006.01) | |
| *H01M 10/46* | (2006.01) | |
| *H01M 8/04537* | (2016.01) | |
| *H01M 8/04111* | (2016.01) | |
| *B60L 50/75* | (2019.01) | |
| *H01M 8/04858* | (2016.01) | |

(52) U.S. Cl.
CPC .......... *H01M 16/006* (2013.01); *B60L 50/75* (2019.02); *H01M 8/04111* (2013.01); *H01M 8/04559* (2013.01); *H01M 8/04567* (2013.01); *H01M 8/04888* (2013.01); *H01M 10/44* (2013.01); *H01M 10/46* (2013.01); *B60L 2210/10* (2013.01); *B60L 2210/40* (2013.01); *H01M 2220/20* (2013.01); *H01M 2250/20* (2013.01)

(58) Field of Classification Search
CPC .......... H01M 16/006; H01M 8/04111; H01M 8/04559; H01M 8/04567; H01M 8/04544; H01M 10/44; H01M 2250/20; B60L 50/75; B60L 50/50; B60L 50/70–72; B60L 58/40; B60L 2210/10; B60L 2210/12; B60L 2210/14
USPC ........................................................ 307/10.1
See application file for complete search history.

(56) References Cited

U.S. PATENT DOCUMENTS

| | | | |
|---|---|---|---|
| 2004/0228055 A1 | 11/2004 | Pearson | |
| 2008/0145716 A1* | 6/2008 | Yu | H01M 8/04753 429/444 |
| 2009/0212634 A1* | 8/2009 | Kojima | B60L 58/20 307/77 |
| 2010/0291445 A1 | 11/2010 | Igarashi | |

(Continued)

OTHER PUBLICATIONS

International Search Report and Written Opinion received from the European Patent Office in connection with International Application No. PCT/US2021/019248 dated Oct. 22, 2021.

*Primary Examiner* — Rexford N Barnie
*Assistant Examiner* — Swarna N Chowdhuri

(57) ABSTRACT

A power generating system comprised of a hydrogen fuel cell and rechargeable battery connected together in series to be used as a load following system without the use of a DC-DC converter. The hydrogen fuel cell's cathode air compressor is driven off of the output of this power generation system. This is made possible by the following innovations: A novel way to wire the systems in series with the use of switches and bypass diodes, a method to limit the system output voltage so that we do not exceed the maximum voltage of downstream components, and an isolated DC-DC converter to charge the rechargeable battery with the hydrogen fuel cell.

11 Claims, 2 Drawing Sheets

(56) References Cited

U.S. PATENT DOCUMENTS

2011/0001353 A1* 1/2011 Emerson ................ B60L 50/40
307/9.1

* cited by examiner

FUEL CELL—BATTERY HYBRID SYSTEM FOR TRANSPORTATION USE

CROSS-REFERENCE TO RELATED PATENT APPLICATION

This regular U.S. patent application relies upon and claims the benefit of U.S. provisional patent application No. 62/808,638, entitled "NOVEL FUEL CELL—BATTERY HYBRID SYSTEM FOR TRANSPORTATION USE," filed on Feb. 21, 2019, which is incorporated by reference herein in its entirety.

FIELD OF THE INVENTION

The disclosed embodiments relate in general to clean energy based air transportation systems technology, and, more specifically, to a novel fuel cell—battery hybrid system for transportation use.

DESCRIPTION OF THE RELATED ART

In a traditional fuel cell system used for transportation propulsion, a battery is used to provide power output bursts required by the application. For example, in a typical automotive application, a response time of 50 ms is desired to human throttle inputs, which is an order of magnitude faster than the fastest fuel cell systems today. The gap is bridged by the battery system that is constantly connected to the fuel cell generator via a complex controllable DC/DC converter that manages power flow between the fuel cell and the battery, and then the battery is connected to the propulsive system via another complex power conversion system.

In such a configuration, typical voltages of the fuel cell system and the buffer battery are limited to 200-250V due to the increasing cost and complexity of larger cell counts that would be required to support higher voltage. On the other hand, optimization of the propulsive part of the system (inverter+motor) demand higher voltages—typically 600-700V in today's high-performance propulsive systems. Therefore, a typical fuel cell architecture today deploys a boost converter to bring the voltage from 200-250V to 600-700V. Such a high boost ratio results in significant electrical stresses for all the power conversion components, and relatively low efficiency of conversion.

Additionally, the voltage levels of the fuel cell stack output can vary by more than 2× between the no-load and full rated load states. This creates additional complexity in power electronics design. The overall outcome is usually an expensive heavy system, wasting up to 10% of the energy in heat output from power conversion electronics at maximum rated power.

SUMMARY OF THE INVENTION

The inventive methodology is directed to methods and systems that substantially obviate one or more of the above and other problems associated with conventional technology.

In accordance with one aspect of the embodiments described herein, there is provided a power generating system comprised of a hydrogen fuel cell and rechargeable battery connected together in series to be used as a load following system without the use of a DC-DC converter. The hydrogen fuel cell's cathode air compressor is driven off of the output of this power generation system. This is made possible by the following innovations: A novel way to wire the systems in series with the use of switches and bypass diodes, a method to limit the system output voltage so that we do not exceed the maximum voltage of downstream components, and an isolated DC-DC converter to charge the rechargeable battery with the hydrogen fuel cell.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
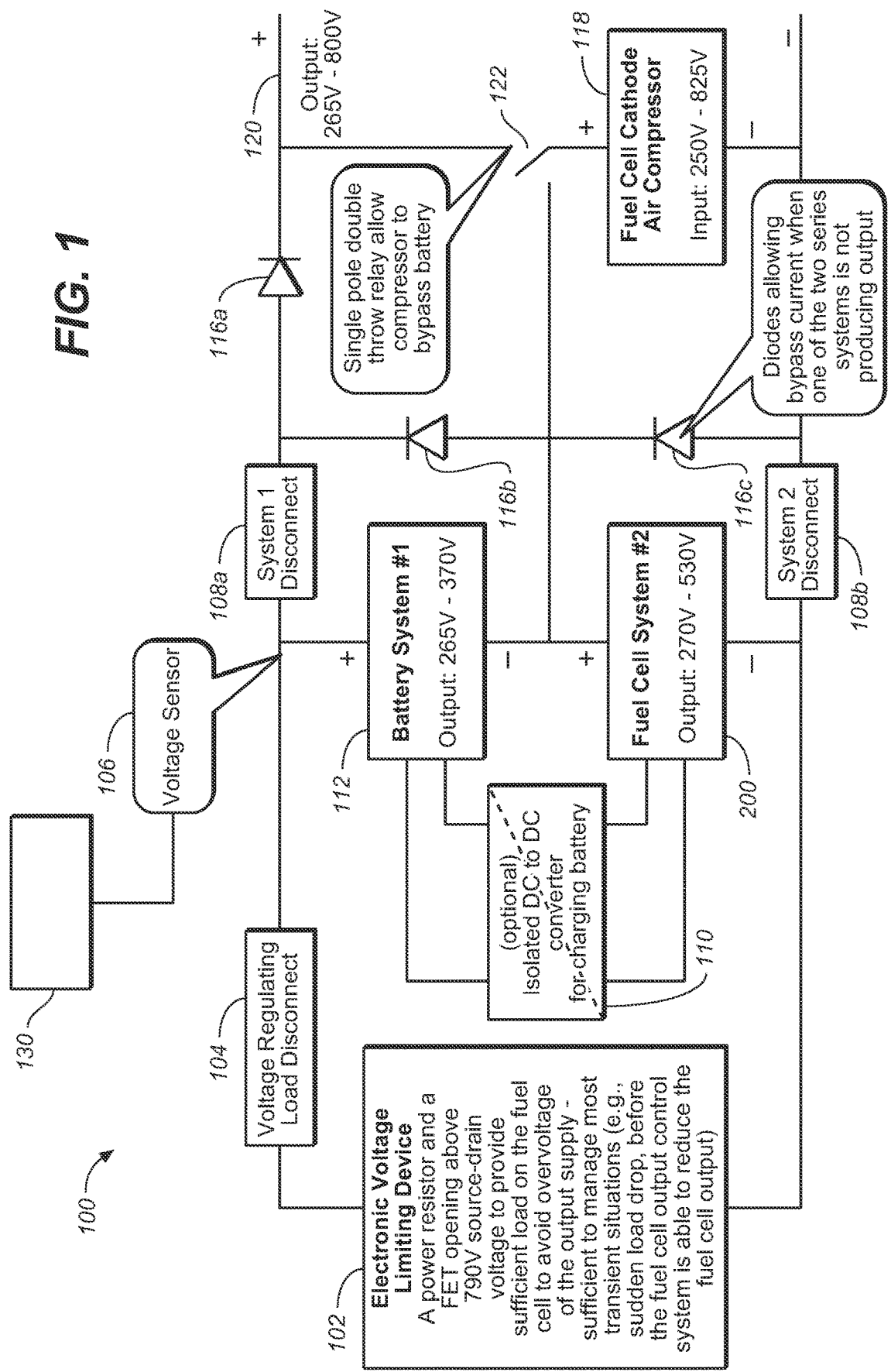
FIG. 1 illustrates an electrical system diagram.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Below, we propose a novel, alternative hybrid system 100 for integrating a fuel cell stack and a battery that eliminates the need for both the DC/DC power converter between the battery 112 and the fuel cell stack (e.g., fuel cell system 200), and the boost converter between the battery 112 and the propulsion inverter. The propulsion inverter is configured to convert alternating current to direct current for actuating motors in electrical communication with the motors. This system results in substantial savings in cost, weight, and power losses compared to state of the art.

Specifically, our novel system 100 consists of the fuel cell stack (e.g., fuel cell system 200) and the battery 112 connected substantially in series, with individual disconnects 104, 108a, 108b, and with bypass diodes 116a, 116b, 116c allowing the power flow even when the battery 112 or the fuel cell system 200 is removed from the circuit by the disconnect 108a, 108b. High quality bypass diodes 116a, 116b, 116c are inexpensive and light, and at typical 250V fuel cell stack (e.g., fuel cell system 200)/battery 112 voltage levels, the bypass diodes 116a, 116b, 116c may result in only 0.3-0.5% losses in the system, compared to the state of the art system losses of up to 10%, with corresponding improvement in the complexity and weight of the cooling systems for such a powertrain. The system 100 may include an output control system 130.

Furthermore, the system 100 also contains an output voltage sensor 106, a voltage regulating disconnect 104 (e.g., a field effect transistor (FET)), and an electronic voltage limiting device 102 that work together with the output control system 130 to prevent overvoltage on the output of the hybrid system 100. An electronic voltage limiting device 102, for example, may include a calibrated load/power resistor that is designed to load the output if the voltage exceeds a predetermined value. For example, the voltage sensor 106 may detect a voltage and the voltage regulating disconnect 104 may open above a source-drain voltage of about 790V and switch in the voltage limiting device 102 (e.g., the calibrated load) to provide sufficient load on the fuel cell to avoid overvoltage of the output supply, sufficient to manage most transient conditions (e.g., sudden load drop, before the fuel cell output control system 130 is able to reduce the fuel cell stack 200 and/or battery 112 output). Due to the typical characteristics of fuel cells, a relatively small load (1% of the max power rating) will result in a very significant voltage drop relative to the open circuit voltage. The dissipated power can be used for useful purposes (heating of the passenger compartment, battery recharge, etc).

Finally, the output control system 130 reads the sensors, conducts necessary calculations, and produces commands delivered to the fuel cell system 200, disconnects 108a, 108b, 104, and the electronic voltage limiting device 102.

In one or more embodiments, the proposed connection approach for the battery 112 and fuel cell stack (e.g., fuel cell system 200) results in the output voltage high enough to operate the propulsive system without an intermediate booster, yet without a possibility of overvoltage.

In one or more embodiments, the output control system 130 connects the battery 112 to the circuit only when the peak/high power is required. An example of a perfect application is an aircraft powertrain, where peak power is needed only on takeoff, while in cruise, only 50-70% of the peak power is required. In the case of such a power profile, the output control system 130 connects the battery 112 into the circuit only for the takeoff and initial climb, producing full output voltage and power. Once the initial climb is complete, the system disconnects the battery and the powertrain operates on just a fuel cell stack (e.g., fuel cell system 200) at a steady output equivalent to 50-70% of the max system power rating.

In one or more embodiments, the battery 112 can be optionally recharged from the fuel cell stack (e.g., fuel cell system 200) via an isolated DC/DC converter. Such DC/DC converter would require a much lower power rating than the original booster converter and therefore would be significantly cheaper and lighter. The overall system weight optimization can be achieved through balancing of the battery 112 capacity (and therefore weight) and the converter power rating.

Below, the Hydrogen fuel cell cathode air compressor 118 can be powered solely off of battery power will be described.

In one or more embodiments, before hydrogen and oxygen are supplied to the anode and cathode of the hydrogen fuel cell stack (e.g., fuel cell system 200), we can power up the cathode air compressor 118 to bring up the hydrogen fuel cell voltage before closing the system #2 fuel cell disconnect 108b. See FIG. 1.

Below, the Hydrogen fuel cell cathode air compressor 118 can be powered solely of the hydrogen fuel cell power while the system load is driven off of the battery 112 and fuel cell (e.g., fuel cell system 200) in series will be described.

In one or more embodiments, to reduce the energy required from the rechargeable battery system we can bypass the battery 112 with a single pole double throw relay 122 on the positive end of the cathode air compressor 118. Bypassing the battery 112 in this manner allows us to extend the power reserves of our system as much as possible. See FIG. 1.

Below, the Hydrogen fuel cell cathode air compressor 118 which can be powered off the hydrogen fuel cell (e.g., fuel cell system 200) and the rechargeable battery 112 in series will be described.

In one or more embodiments, to run the cathode air compressor 118 as efficiently and at full power we can drive the cathode air compressor 118 on the combined battery 112 and fuel cell voltage (e.g., fuel cell system 200) using the system 100 detailed in FIG. 1. By closing both the battery and fuel cell disconnects 108a, 108b and not bypassing the battery 112 with the double pole single throw relay 122, we can supply the combined voltage to the cathode air compressor 118. See FIG. 1.

Below, the hydrogen fuel cell cathode air compressor 118 can be started off of the rechargeable battery 112 and transition to run off of both the rechargeable battery 112 and fuel cell (e.g., fuel cell system 200) in series.

In one or more embodiments, the system can start with the fuel cell disconnect 108a open effectively removing the fuel cell (e.g., fuel cell system 200) from the circuit, and allowing current to pass through the fuel cell bypass diode 116a. Power is applied to the cathode air compressor 118, voltage is then present across the fuel cell (e.g., fuel cell system 200), and then the fuel cell disconnect 108a is closed to bring the system to the full combined stack voltage. See FIG. 1.

Below, the hydrogen fuel cell can charge the rechargeable battery via an isolated DC to DC converter 110 will be described.

In one or more embodiments, when excess power is available from the (e.g., fuel cell system 200) it is possible using an isolated DC to DC converter 110 to charge the battery 112 to extend the range of the system 100. This is desirable because hydrogen has a significant energy density advantage over the currently available battery technologies. See FIG. 1.

Below, a voltage limiting device 102 is used such that the combined battery 112 and fuel cell (e.g., fuel cell system 200) output voltage cannot exceed a specified high voltage limit will be described.

In one or more embodiments, a power resistor and a FET opening above 790V source-drain voltage to provide sufficient load on the fuel cell to avoid overvoltage of the output supply—sufficient to manage most transient situations (e.g., sudden load drop, before the fuel cell output control system 130 is able to reduce the fuel cell output).

Below, the system 100 provides a method to remove the battery can be removed if its no longer desirable will be described.

In one or more embodiments, if the battery is depleted or no longer desired it can be taken out of the circuit by opening the battery system disconnect 108a, 108b. See FIG. 1. The system power will then flow through the battery bypass diode keeping the system powered. Reasons to remove the battery include safety.

Figure 2:
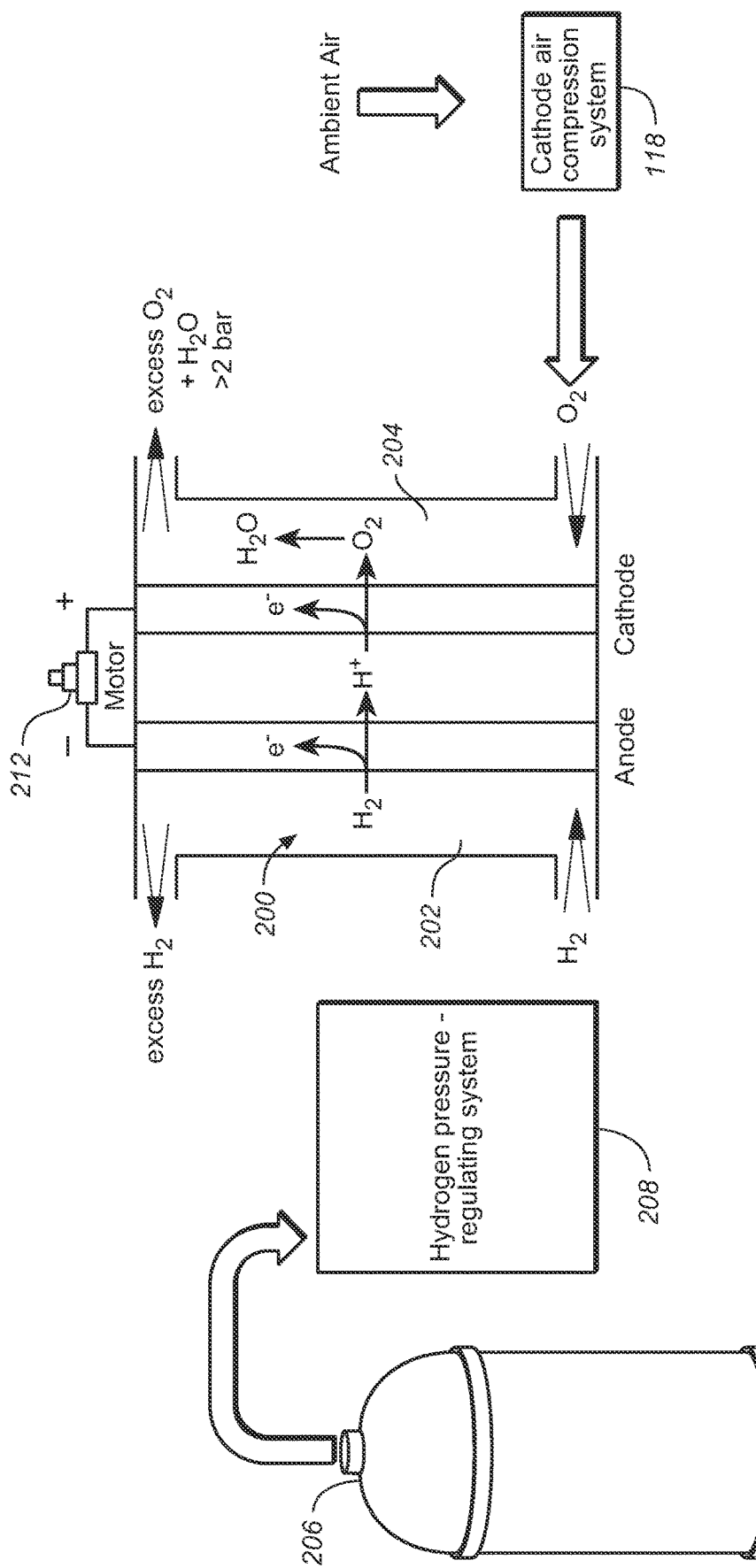
FIG. 2 illustrates a fuel cell diagram.

FIG. 1 illustrates an electrical system diagram—The Hybrid Energy generation system consists of the following items:

Fuel Cell: Combines Hydrogen and Oxygen to produce power;

Battery: Electrochemical energy storage system;

Isolated DC/DC converter: Charges battery from fuel cell, with excess power from fuel cell;

Cathode Air Compressor 118: Compresses air containing oxygen to supply the cathode of the hydrogen fuel cell. The cathode air compressor 118 consists of an inverter driving an electric motor which drives a turbine to compress air;

Voltage Limiting Device: Prevents the system output voltage from exceeding the voltage limits of the cathode air compressor 118; and Voltage sensor 106: provides feedback to voltage limiting device, FIG. 2 illustrates a Fuel Cell diagram.

Specific components that can be used in a 200 kw power generation system:

To build a 250KW capable system we can use the following components:

Diodes 116a, 116b, 116c—APTDF400U120G. This diode is capable of running in systems up to 1200V and is capable of operating at 400A continuously with 750A surges.

Isolated DC to DC converter 110—Isolated DC/DC Converter 27kW—300-400V to 500-700V Reversible. This isolated DC to DC converter 110 can convert the optimal 300V fuel cell to a 700 combined stack voltage if connected as an additive DC to DC converter.

Disconnects—KILOVAC LEV200 Series Contactor With 1 Form X Contacts Rated 500+ Amps, 12-900Vd—This contactor is capable of running in systems up to 900V and is capable of operating at 500A continuously with 1000A surges.

Single Pole Double Throw Relay—GIGAVAC 15 kV SPDT HV Relay—This relay is capable of running in systems up to 15 KV and is capable of operating at 45A continuously. This is capable of conducting the power needed to supply 27KW at 600V, easily supplying a sub 20KW cathode air compressor 118.

Fuel cell cathode air compressor 118—EMTC-120 k Air—This compressor has been configured to supply air to a 120 KW fuel cell system 200, running optimally at 17 KW. Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. An integrated fuel cell stack and battery system, comprising:
   a fuel cell stack configured to supply power to a propulsion inverter;
   a battery configured to supply power to the propulsion inverter;
   a plurality of system disconnects operably connected to the fuel cell stack and the battery;
   a plurality of bypass diodes operably connected to the fuel cell stack and the battery,
      wherein the plurality of bypass diodes and the plurality of system disconnects are configured to selectively provide power to the propulsion inverter by at least one of the battery or the fuel cell stack either individually or simultaneously;
   a sensor configured to detect an output voltage of the integrated fuel cell stack and battery system; and
   an output control system configured to cause the integrated fuel cell stack and battery system to:
      access a first accessed signal from the sensor;
      determine if the accessed first signal is greater than a first threshold voltage as first a determination; and
      operably connect an output of the battery to the integrated fuel cell stack and battery system by the plurality of system disconnects based on the determination; and
   a voltage limiting device configured to present an output load; and
   a voltage regulating disconnect operably connected to the voltage limiting device and the output of the integrated fuel cell stack and battery system, the voltage regulating disconnect configured to prevent the output voltage to be greater than a predetermined threshold voltage on the output of the integrated fuel cell stack and battery system by switching in the voltage limiting device, based on the first accessed signal,
      wherein the voltage limiting device includes a calibrated load configured to load the output of the integrated fuel cell stack and battery system in a case where the output voltage exceeds the predetermined threshold voltage.

2. The integrated fuel cell stack and battery system according to claim 1, wherein the voltage regulating disconnect includes a field effect transistor (FET).

3. The integrated fuel cell stack and battery system according to claim 1, wherein the output control system further causes the system to: access a second accessed signal from the sensor;
   determine if the second accessed signal is greater than the second threshold voltage as a second determination; and
   operably connect the voltage limiting device across the output of the integrated fuel cell stack and battery system by the voltage regulating disconnect based on the second determination.

4. The integrated fuel cell stack and battery system according to claim 1, further comprising a cathode air compressor configured to be powered by at least one of the fuel cell stack or the battery.

5. The integrated fuel cell stack and battery system according to claim 4, further comprising a single pole double throw relay configured to bypass the battery.

6. The integrated fuel cell stack and battery system according to claim 4, wherein a single pole double throw relay is operably connected to a positive terminal of the cathode air compressor.

7. The integrated fuel cell stack and battery system according to claim 1, further comprising a DC to DC converter configured to recharge the battery based on an output voltage of the fuel cell stack.

8. A method for integrated fuel cell stack and battery management system, the method comprising:
- accessing a first signal from a sensor to provide a first accessed sensor signal, the sensor configured to detect an output voltage of at least one of a battery or a fuel cell, either individually or in series;
- determining if the first accessed sensor signal is greater than a first threshold voltage to provide a first determination;
- operably connecting the output voltage of at said at least one of said battery or said fuel cell of the battery by a plurality of system disconnects based on the first determination,
- wherein the plurality of system disconnects is operably connected to the fuel cell stack and the battery, and
- wherein a plurality of bypass diodes and the plurality of system disconnects are configured to selectively provide power to a propulsion inverter by at least one of the battery or the fuel cell stack, either individually or simultaneously:
- accessing a second signal from the sensor to provide a second accessed sensor signal;
- determining if the second accessed sensor signal is above a second threshold to provide a second determination; and
- operably connecting a voltage limiting device across the output voltage of at said at least one of said battery or said fuel cell by a voltage regulating disconnect based on the second determination, wherein the voltage limiting device is configured to present an output load; and
- wherein the voltage regulating disconnect is operably connected to the voltage limiting device and an output of the integrated fuel cell stack and battery management system, the voltage regulating disconnect configured to prevent an output voltage above a predetermined second threshold on said output of the integrated fuel cell stack and battery management system by switching in the voltage limiting device, based on the first accessed sensor signal.

9. The method according to claim 8, further comprising: powering a cathode air compressor by at least one of the fuel cell stack or the battery.

10. The method according to claim 8, further comprising bypassing the output voltage of at said at least one of said battery or said fuel cell of the battery by a single pole double throw relay.

11. The method according to claim 8, further comprising recharging the battery by a DC to DC converter based on the output voltage.

* * * * *